US012240467B2

(12) United States Patent
Hara

(10) Patent No.: US 12,240,467 B2
(45) Date of Patent: Mar. 4, 2025

(54) APPARATUS, METHOD, AND COMPUTER PROGRAM FOR MONITORING DRIVER

(71) Applicant: TOYOTA JIDOSHA KABUSHIKI KAISHA, Toyota (JP)

(72) Inventor: Kenichiroh Hara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 18/093,589

(22) Filed: Jan. 5, 2023

(65) Prior Publication Data

US 2023/0227044 A1 Jul. 20, 2023

(30) Foreign Application Priority Data

Jan. 18, 2022 (JP) .................................. 2022-005818

(51) Int. Cl.
 *B60W 40/08* (2012.01)
 *G06V 20/59* (2022.01)
 *G06V 40/16* (2022.01)

(52) U.S. Cl.
 CPC ........... *B60W 40/08* (2013.01); *G06V 20/597* (2022.01); *G06V 40/161* (2022.01); *B60W 2040/0818* (2013.01); *B60W 2040/089* (2013.01); *B60W 2420/403* (2013.01); *B60W 2420/54* (2013.01); *B60W 2540/21* (2020.02); *B60W 2540/223* (2020.02)

(58) Field of Classification Search
 CPC ............. B60W 40/08; B60W 2540/21; B60W 2540/223; B60W 2040/0818; B60W 2040/089; B60W 2420/403; B60W 2420/54; G06V 20/597; G06V 40/161
 USPC ......................................................... 340/576
 See application file for complete search history.

(56) References Cited

U.S. PATENT DOCUMENTS

2022/0126878 A1* 4/2022 Moustafa ............. G08G 1/0112
2022/0165073 A1* 5/2022 Shikii ................... B60W 40/09

FOREIGN PATENT DOCUMENTS

| CN | 113056390 A | * | 6/2021 | ............. B60R 11/04 |
| JP | 2016-9256 A | | 1/2016 | |
| JP | 2020-123380 A | | 8/2020 | |
| JP | 2020-173836 A | | 10/2020 | |
| WO | WO-2020006154 A2 | * | 1/2020 | ............. B60R 11/04 |

* cited by examiner

*Primary Examiner* — Kam Wan Ma
(74) *Attorney, Agent, or Firm* — Sughrue Mion, PLLC

(57) ABSTRACT

A driver monitor includes a processor configured to: detect the posture of a driver of a vehicle from an image of the interior of the vehicle generated by a camera provided on the vehicle, determine that the driver's condition is abnormal, when the detected posture satisfies an abnormality determining condition, detect an unusual sound made by the driver of the vehicle, based on a voice signal of the interior of the vehicle obtained by a microphone provided on the vehicle, and make the abnormality determining condition for the case where the unusual sound is detected less strict than an abnormality determining condition for the case where the unusual sound is not detected.

7 Claims, 5 Drawing Sheets

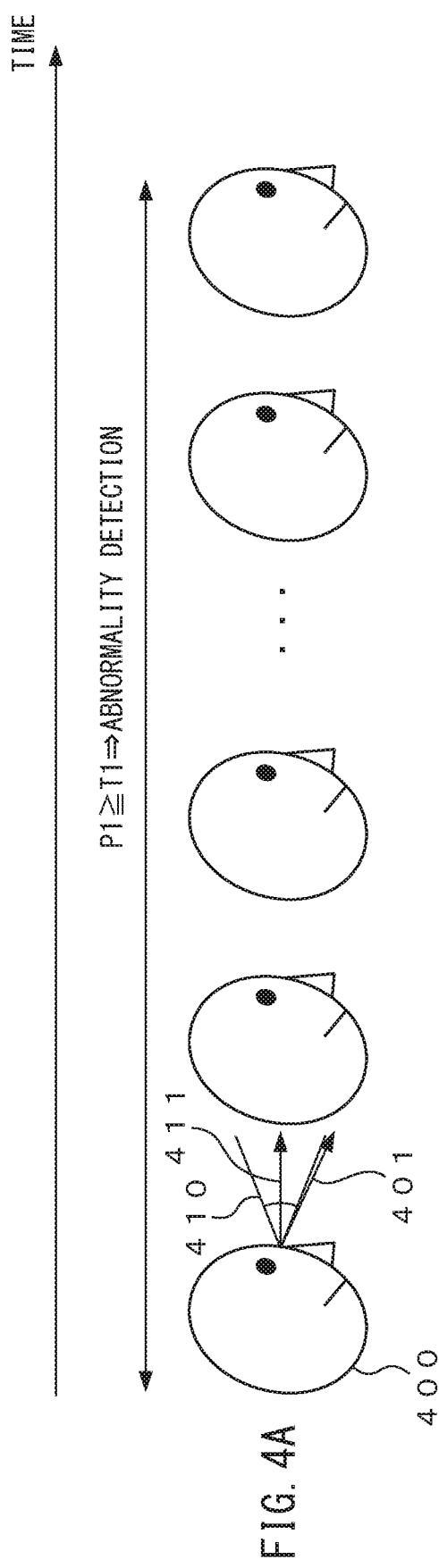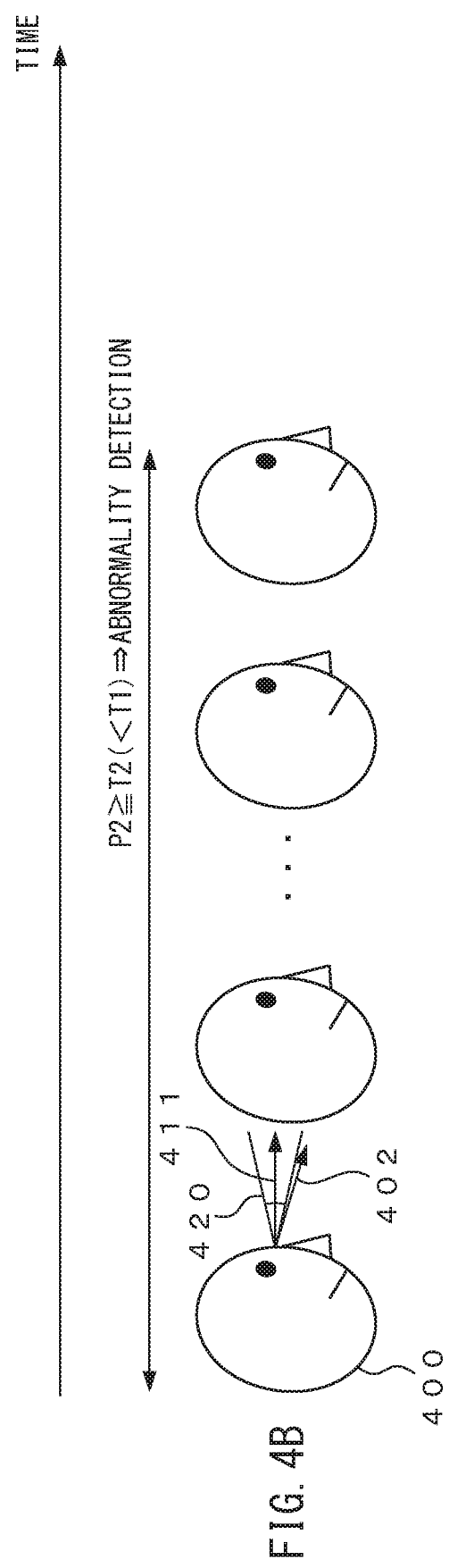

APPARATUS, METHOD, AND COMPUTER PROGRAM FOR MONITORING DRIVER

FIELD

The present invention relates to an apparatus, a method, and a computer program for monitoring a vehicle driver.

BACKGROUND

A technique to determine whether a vehicle driver is in a state suitable for driving a vehicle by monitoring the driver has been proposed (see Japanese Unexamined Patent Publication JP2020-173836A).

In the technique disclosed in JP2020-173836A, an autonomous driving vehicle that has autonomous driving mode to execute autonomous travel detects a change in a driver's and/or another occupant's health caused by a predetermined disease or symptom, and identifies the predetermined disease or symptom having caused the detected change in health. The autonomous driving vehicle then determines a hospital having a medical specialist and/or specialized equipment in the identified disease or symptom as a destination, and moves to the determined destination in autonomous driving mode. To detect a change in health, the autonomous driving vehicle uses at least one of image information from one or more cameras for taking pictures of the vehicle interior, voice information from a microphone for collecting a sound or a voice in the vehicle interior, and sensor information from one or more sensors provided on the autonomous driving vehicle.

SUMMARY

A vehicle may be under autonomous driving control without the driver being required to participate in driving, under a certain condition, e.g., in the case where autonomous driving of level 3 defined by the Society of Automotive Engineers (SAE) is applied to the vehicle. In such a situation, the driver is allowed not to be in a posture suitable for driving (hereafter simply a "driving posture"). When a driver's posture differs from the driving posture, it may be difficult to determine whether some problem has arisen in the driver, based on images obtained by taking pictures of the driver. In such a case, even if voice information from a microphone is referred to for determining the driver's state, as in the above-described prior art, it is necessary to analyze images of the driver obtained for a relatively long time to detect the driver's abnormal condition.

It is an object of the present invention to provide a driver monitor that can appropriately detect a driver's abnormal condition.

According to an embodiment, a driver monitor is provided. The driver monitor includes a processor configured to: detect the posture of a driver of a vehicle from an image of the interior of the vehicle generated by a camera provided on the vehicle, determine that the driver's condition is abnormal, when the detected posture satisfies an abnormality determining condition, detect an unusual sound made by the driver of the vehicle, based on a voice signal of the interior of the vehicle obtained by a microphone provided on the vehicle, and make the abnormality determining condition for the case where the unusual sound is detected less strict than an abnormality determining condition for the case where the unusual sound is not detected.

Preferably, the processor of the driver monitor detects at least either one of the position and the orientation of the driver's face as the driver's posture, and the abnormality determining condition is that a period during which the orientation or the position of the driver's face has been outside a predetermined normal range is not shorter than a predetermined time threshold. Further, the processor makes the normal range for the case that the unusual sound is detected more restricted than the normal range for the case where the unusual sound is not detected or makes the time threshold for the case that the unusual sound is detected less than the time threshold for the case where the unusual sound is not detected.

In this case, the processor is preferably further configured to determine the type of the unusual sound depending on the state of the driver making the unusual sound, and the processor preferably sets the normal range for the case where the unusual sound is detected, depending on the type of the unusual sound.

For example, the normal range is preferably a range of a downward angle of the driver's face relative to a reference direction, and the processor preferably makes the range of the downward angle for the case where the type of the detected unusual sound is a sound of the driver's coughs or the driver's snores caused by sleep apnea syndrome more restricted than the range of the downward angle for the case where the unusual sound is not detected.

Alternatively, the normal range is preferably a range of a horizontal angle of the driver's face relative to a reference direction, and the processor preferably makes the range of the horizontal angle for the case where the type of the detected unusual sound is a sound of the driver's snores caused by cerebral infarction more restricted than the range of the horizontal angle for the case where the unusual sound is not detected.

Alternatively, the normal range is preferably a range of a downward angle of the driver's face relative to a reference direction and a range of the position of the driver's face around a reference position; and the processor preferably makes the range of the downward angle for the case where the type of the detected unusual sound is a sound of the driver's sobbing more restricted than the range of the downward angle for the case where the unusual sound is not detected, and makes the distance from the reference position to a lower limit of the normal range for the case where the type of the detected unusual sound is a sound of the driver's sobbing less than the distance for the case where the unusual sound is not detected.

According to another embodiment, a method for monitoring a driver is provided, which includes: detecting the posture of a driver of a vehicle from an image of the interior of the vehicle generated by a camera provided on the vehicle; determining that the driver's condition is abnormal, when the detected posture satisfies an abnormality determining condition; detecting an unusual sound made by the driver of the vehicle, based on a voice signal of the interior of the vehicle obtained by a microphone provided on the vehicle; and making the abnormality determining condition for the case where the unusual sound is detected less strict than an abnormality determining condition for the case where the unusual sound is not detected.

According to still another embodiment, a non-transitory recording medium that stores a computer program for monitoring a driver is provided. The computer program includes instructions causing a processor mounted on a vehicle to execute a process including: detecting the posture of a driver of the vehicle from an image of the interior of the vehicle generated by a camera provided on the vehicle; determining that the driver's condition is abnormal, when the detected posture satisfies an abnormality determining condition; detecting an unusual sound made by the driver of the vehicle, based on a voice signal of the interior of the vehicle obtained by a microphone provided on the vehicle; and making the abnormality determining condition for the case where the unusual sound is detected less strict than an abnormality determining condition for the case where the unusual sound is not detected.

The driver monitor according to the present disclosure has an advantageous effect of being able to appropriately detect a driver's abnormal condition.

BRIEF DESCRIPTION OF DRAWINGS

FIG. 4A illustrates an example of determination of a driver's abnormality for the case that the driver's unusual sound is not detected.

FIG. 4B illustrates an example of determination of a driver's abnormality for the case that the driver's unusual sound is detected.

DESCRIPTION OF EMBODIMENTS

A driver monitor, a method for monitoring a driver executed by the driver monitor, and a computer program for monitoring a driver will now be described with reference to the attached drawings. When an unusual sound made by a driver is detected on the basis of a voice signal of the interior of a vehicle, the driver monitor makes a condition for determining abnormality on the basis of the driver's posture detected from an image of the interior of the vehicle less strict than the condition for the case that no unusual sound is detected. In this way, the driver monitor prevents erroneous detection that the driver's condition is abnormal when the driver who is in a normal condition is not in a posture suitable for driving (hereafter simply a "driving posture"). In addition, the driver monitor can appropriately detect the driver's abnormal condition, by relaxing the condition for determining abnormality when the driver's unusual sound is detected.

Figure 1:
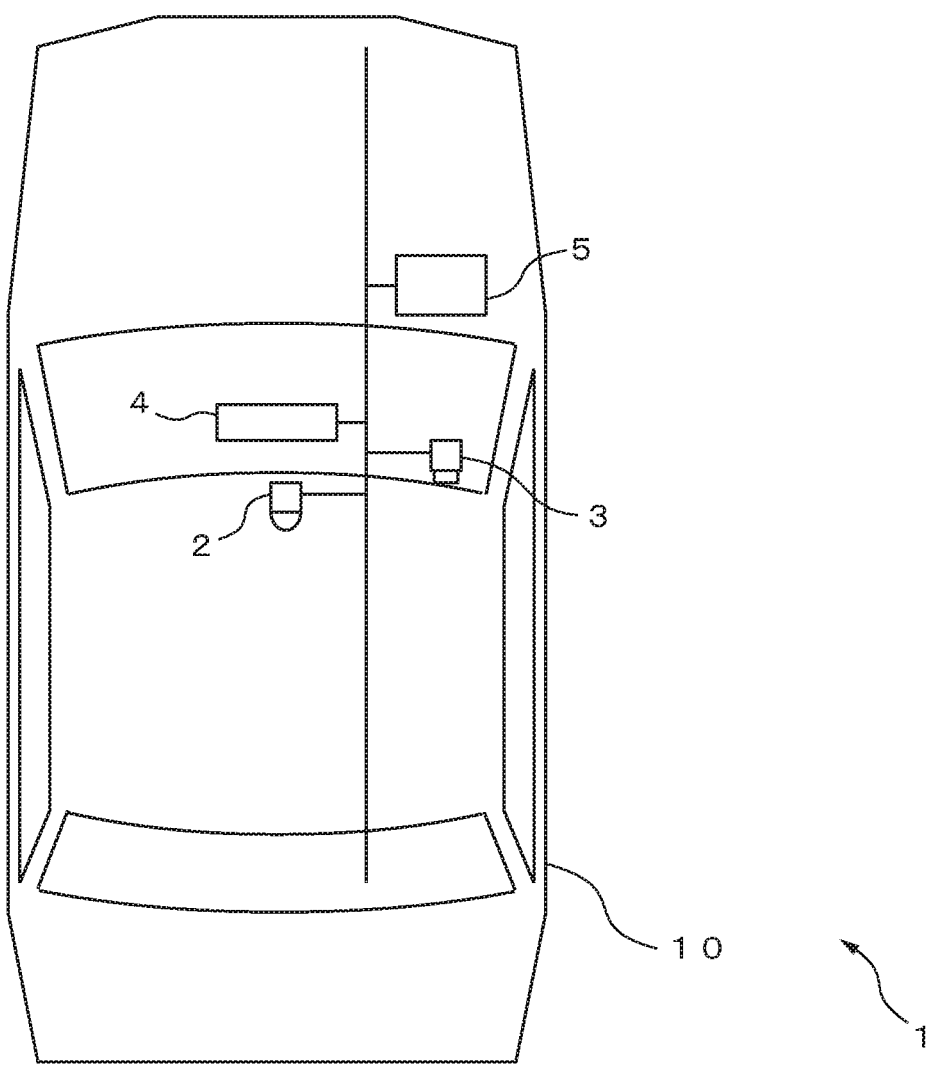
FIG. 1 schematically illustrates the configuration of a vehicle control system including a driver monitor.

FIG. 1 schematically illustrates the configuration of a vehicle control system including the driver monitor. In the present embodiment, the vehicle control system 1, which is mounted on a vehicle 10 and controls the vehicle 10, includes a microphone 2, a driver monitoring camera 3, a notification device 4, and an electronic control unit (ECU) 5, which is an example of the driver monitor. The microphone 2, the driver monitoring camera 3, and the notification device 4 are communicably connected to the ECU 5 via an in-vehicle network conforming to a communication standard, such as a controller area network. The vehicle control system 1 may include an outside camera (not illustrated) for taking pictures of a region around the vehicle 10 to generate images representing the surroundings region. In addition, the vehicle control system 1 may include a distance sensor (not illustrated), such as LiDAR or radar, which measures the distances from the vehicle 10 to objects around the vehicle 10. The vehicle control system 1 may further include a measurement device (not illustrated), such as a GPS receiver, for measuring the position of the vehicle 10, based on signals from satellites, a navigation device (not illustrated) for searching for a planned travel route to a destination; and a storage device (not illustrated) that stores map information referred to in autonomous driving control of the vehicle 10.

The vehicle control system 1 can control the vehicle 10 at driving control level 3 defined by the SAE, i.e., at a driving control level in which the driver is not required to operate the accelerator, brake, and steering and to watch around the vehicle. The ECU 5 executes a driver monitoring process while controlling the vehicle 10 at driving control level 3. However, the invention is not limited thereto, and the ECU 5 may also execute a driver monitoring process while controlling the vehicle 10 at a driving control level at which the driver participates in driving the vehicle 10, e.g., at any of driving control levels 0 to 2 defined by the SAE.

The microphone 2, which is an example of the voice collection unit, is mounted in the interior of the vehicle 10. In particular, the microphone 2 is mounted near the driver, e.g., near an instrument panel so that a voice made by the driver can be collected. The microphone 2 collects a voice made in the interior of the vehicle and generates a voice signal representing the voice. The microphone 2 outputs the generated voice signal to the ECU 5.

The driver monitoring camera 3, which is an example of the image capturing unit, includes a two-dimensional detector constructed from an array of optoelectronic transducers, such as CCD or C-MOS, having sensitivity to visible or infrared light and a focusing optical system that forms an image of a target region of capturing on the two-dimensional detector. The driver monitoring camera 3 may further include a light source, such as an infrared LED, for illuminating the driver. The driver monitoring camera 3 is mounted, for example, on or near the instrument panel and oriented to the driver so that the head of the driver sitting on the driver's seat of the vehicle 10 may be included in the target region of capturing, i.e., so that pictures of the driver's head can be taken. The driver monitoring camera 3 takes pictures of the driver every predetermined capturing period (e.g., 1/30 to 1/10 seconds) and generates images representing the driver (hereafter, "driver images"). The driver images obtained by the driver monitoring camera 3 may be color or grayscale images. Whenever a driver image is generated, the driver monitoring camera 3 outputs the generated driver image to the ECU 5 via the in-vehicle network.

The notification device 4 is provided in the interior of the vehicle 10, and makes a predetermined notification to the driver by light, voice, vibration, or display of characters or an image. To achieve this, the notification device 4 includes, for example, at least a speaker, a light source, a vibrator, or a display. When a notification indicating a warning to the driver is received from the ECU 5, the notification device 4 notifies the driver of the warning by a voice from the speaker, lighting or blinking of the light source, vibration of the vibrator, or a warning message on the display.

The ECU 5 controls driving of the vehicle 10 in accordance with a driving control level applied to the vehicle 10. In addition, the ECU 5 monitors the driver, based on voice signals received from the microphone 2 and driver images received from the driver monitoring camera 3, and detects the driver's abnormal condition. When it is determined that the driver's condition is abnormal, the ECU 5 warns the driver or controls the vehicle 10 so that the vehicle 10 makes an emergency stop.

Figure 2:
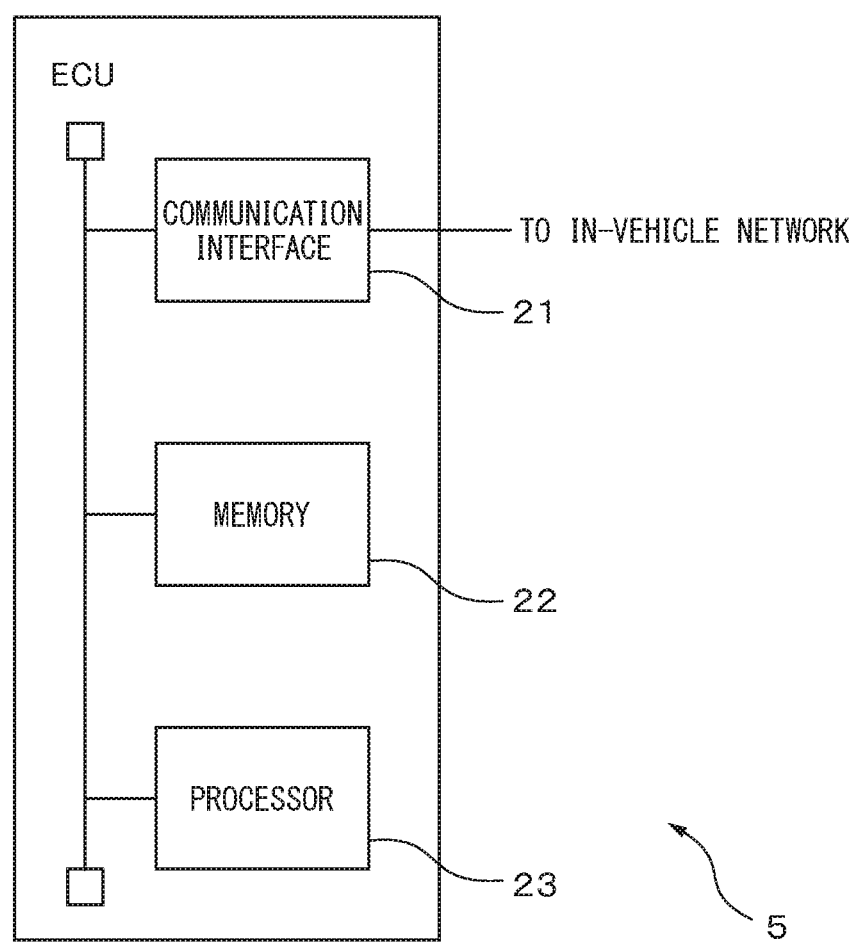
FIG. 2 illustrates the hardware configuration of an ECU, which is an example of the driver monitor.

FIG. 2 illustrates the hardware configuration of the ECU 5. As illustrated in FIG. 2, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. The communication interface 21 passes a voice signal received from the microphone 2 to the processor 23. Whenever a driver image is received from the driver monitoring camera 3, the communication interface 21 passes the received driver image to the processor 23. In addition, when information to be notified to the driver with the notification device 4, such as a notification indicating a warning to the driver, is received from the processor 23, the communication interface 21 outputs this information to the notification device 4.

The memory 22, which is an example of a storage unit, includes, for example, volatile and nonvolatile semiconductor memories, and stores various algorithms and various types of data used in the driver monitoring process executed by the processor 23 of the ECU 5. For example, the memory 22 stores various parameters used for detecting the driver's posture and an unusual sound made by the driver. The memory 22 also stores parameters for defining a condition for determining whether the driver's condition is abnormal (hereafter simply an "abnormality determining condition"). In addition, the memory 22 temporarily stores voice signals, driver images, and various types of data generated during the driver monitoring process. In addition, the memory 22 stores various parameters and various types of data used for controlling driving of the vehicle 10. Such data includes images generated by the outside camera, ranging signals generated by the distance sensor, positioning signals indicating the position of the vehicle 10 generated by the GPS receiver, a planned travel route generated by the navigation device, and the map information.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes a control process for driving the vehicle including the driver monitoring process at predetermined intervals.

Figure 3:
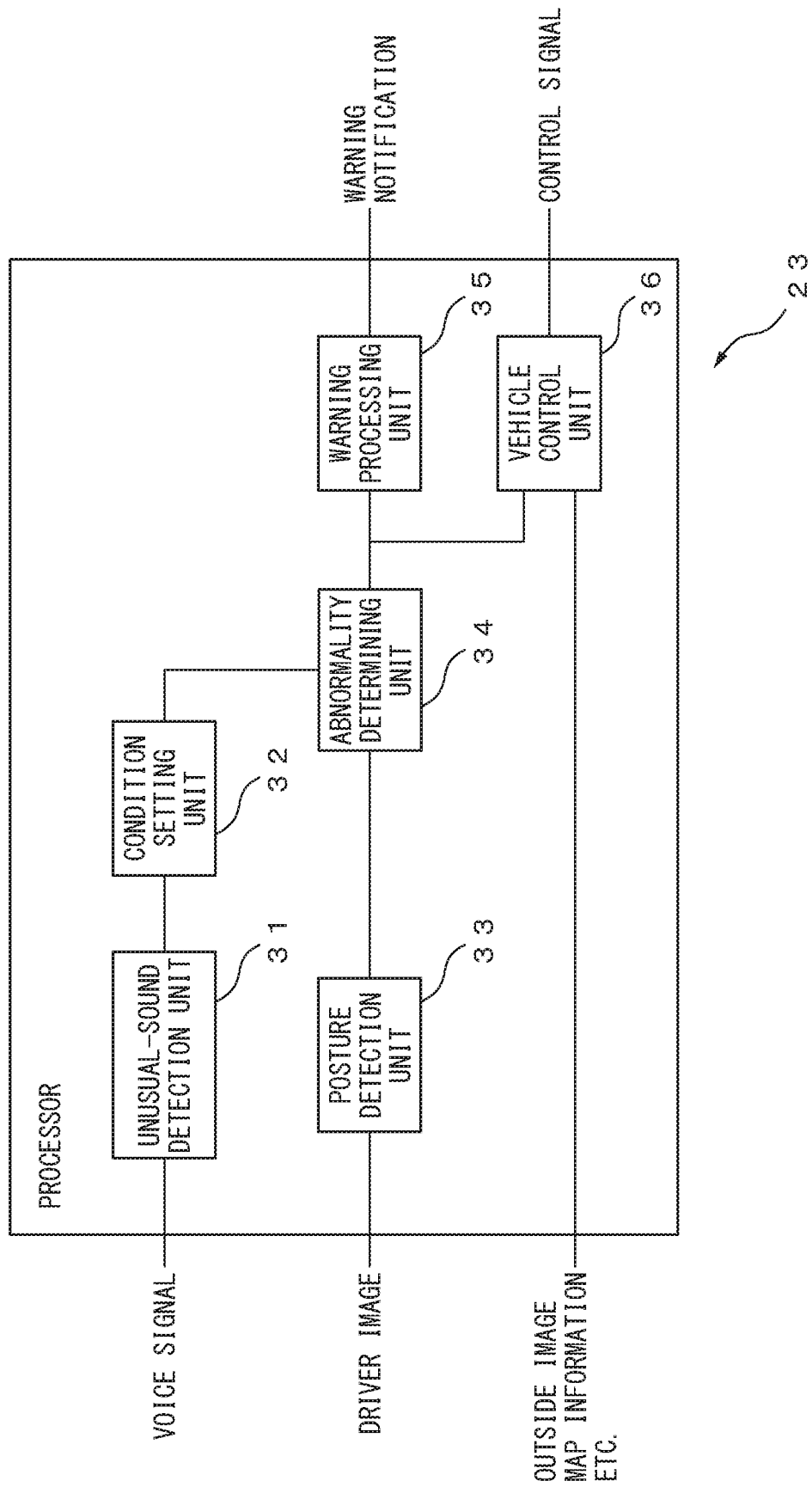
FIG. 3 is a functional block diagram of a processor of the ECU, related to a driver monitoring process.

FIG. 3 is a functional block diagram of the processor 23, related to the control process for driving the vehicle including the driver monitoring process. The processor 23 includes an unusual-sound detection unit 31, a condition setting unit 32, a posture detection unit 33, an abnormality determining unit 34, a warning processing unit 35, and a vehicle control unit 36. These units included in the processor 23 are functional modules, for example, implemented by a computer program executed by the processor 23, or may be dedicated operating circuits provided in the processor 23. Of these units included in the processor 23, processing executed by the unusual-sound detection unit 31, the condition setting unit 32, the posture detection unit 33, and the abnormality determining unit 34 corresponds to the driver monitoring process.

The unusual-sound detection unit 31 detects an unusual sound made by the driver, based on a voice signal obtained by the microphone 2 and received by the processor 23, and determines the type of the detected unusual sound.

In the present embodiment, an unusual sound made by the driver refers to a sound made by the driver when the driver may have difficulty in driving the vehicle 10, i.e., when the driver's condition may be abnormal. Such an unusual sound may be a sound made by, for example, sobbing, coughing, groaning, snoring in the case of cerebral infarction, or snoring caused by sleep apnea syndrome (SAS).

The unusual-sound detection unit 31 determines whether the driver has made an unusual sound, by inputting a voice signal of a preceding predetermined period (e.g., a period of several seconds to several tens of seconds) into a detector that has been trained to detect an unusual sound from a voice signal. As such a detector, the unusual-sound detection unit 31 can use, for example, a "deep neural network (DNN)." The DNN used as the detector for detecting an unusual sound may be, for example, a recurrent neural network (RNN) or a convolutional neural network (CNN). When the detector is based on an RNN, the detector includes a recursive operation layer that executes a recursive operation, such as a long short-term memory (LSTM) or a gated recurrent unit (GRU). When the detector is based on a CNN, the detector includes at least one convolution layer that executes a convolution operation for each predetermined filtering range. The detector may further include an operation layer that executes another operation, such as a fully-connected layer and a pooling layer that executes a pooling operation. The detector further includes an output layer that outputs a confidence score indicating how likely the driver has made an unusual sound for each type of unusual sound by executing a softmax operation or a sigmoid operation on the result of operation calculated by these layers. When the confidence score of a certain type of unusual sound is not less than a predetermined detection threshold, the unusual-sound detection unit 31 detects an unusual sound of this type. In contrast, when the confidence score of any type of unusual sound is less than the detection threshold, the unusual-sound detection unit 31 determines that the driver is not making an unusual sound. The types of unusual sounds whose confidence scores are calculated by the output layer of the detector may include a normal sound. In this case, the unusual-sound detection unit 31 detects an unusual sound whose type has the highest confidence score. More specifically, when a normal sound has the highest calculated confidence score of the types of unusual sounds, the unusual-sound detection unit 31 determines that the driver is not making an unusual sound.

Instead of the detector, the unusual-sound detection unit 31 may use unusual-sound detecting conditions preset for respective types of unusual sounds for detecting an unusual sound made by the driver. When the voice signal satisfies one of the unusual-sound detecting conditions, the unusual-sound detection unit 31 determines that the driver has made an unusual sound corresponding to the unusual-sound detecting condition. In this case, the unusual-sound detection unit 31 divides the voice signal into frames each having a predetermined length of time (e.g., a hundred to several hundred milliseconds), and executes the fast Fourier transform for each frame to calculate the frequency spectrum of the voice signal of each frame. The unusual-sound detection unit 31 may then compare individual frequency components included in the frequency spectrum of the voice signal of each frame with thresholds that are set depending on the type of unusual sound to be detected, thereby detecting an unusual sound made by the driver. More specifically, when the individual frequency components are not less than thresholds set for a certain type of unusual sound, the unusual-sound detection unit 31 detects that the driver has made an unusual sound of this type. Alternatively, the unusual-sound detection unit 31 may calculate an envelope of the time-varying waveform of the voice signal, and compare the envelope with unusual-sound waveforms prepared for respective types of unusual sounds, thereby detecting an unusual sound made by the driver. For example, when a normalized cross-correlation value between the envelope of the time-varying waveform of the voice signal and an unusual-sound waveform is not less than a predetermined detection threshold, the unusual-sound detection unit 31 detects that the driver has made an unusual sound of the type corresponding to the unusual-sound waveform.

When the driver's unusual sound is detected, the unusual-sound detection unit 31 notifies the condition setting unit 32 of the fact that an unusual sound is detected and the type of the detected unusual sound.

The condition setting unit 32 sets an abnormality determining condition applied to the driver's posture detected from a driver image. In the present embodiment, the condition setting unit 32 makes the abnormality determining condition for the case where the driver's unusual sound is detected by the unusual-sound detection unit 31 less strict than the abnormality determining condition for the case where the driver's unusual sound is not detected.

As will be described in detail below, the driver's abnormal condition is determined on the basis of the position or the orientation of the driver's face. More specifically, when a period during which the position of the driver's face has been outside a normal range of the position of the driver's face, which is set as the abnormality determining condition, is not shorter than a time threshold, it is determined that the driver's condition is abnormal. Alternatively, when a period during which the orientation of the driver's face has been outside a normal range of the orientation of the driver's face is not shorter than the time threshold, it is determined that the driver's condition is abnormal. Thus the condition setting unit 32 sets the normal ranges of the position and the orientation of the face and the time threshold as the abnormality determining condition.

For example, the condition setting unit 32 sets a circular or elliptic region centered at a reference position in the driver image corresponding to a supposed position of the face of the driver driving the vehicle 10, as the normal range of the position of the face. Specifically, the condition setting unit 32 makes the radius from the reference position to the outer edge of the normal range for the case where the driver's unusual sound is detected less than the radius from the reference position to the outer edge of the normal range for the case where the driver's unusual sound is not detected. In other words, the condition setting unit 32 makes the normal range of the position of the face for the case where the driver's unusual sound is detected more restricted than the normal range of the position of the face for the case where the driver's unusual sound is not detected.

In addition, the condition setting unit 32 sets an angle range centered in a reference direction that is the orientation of the driver's face for the case that the driver's face is directed to the front of the vehicle 10 and perpendicular to the bottom of the vehicle 10, as the normal range of the orientation of the face. Specifically, the condition setting unit 32 makes the threshold of the angle relative to the reference direction corresponding to the outer edge of the normal range for the case where the driver's unusual sound is detected less than the threshold of the angle relative to the reference direction corresponding to the outer edge of the normal range for the case where the driver's unusual sound is not detected. In other words, the condition setting unit 32 makes the normal range of the orientation of the face for the case where the driver's unusual sound is detected more restricted than the normal range of the orientation of the face for the case where the driver's unusual sound is not detected. For example, the condition setting unit 32 sets the angular threshold for the case where the driver's unusual sound is detected at 20 to 30 degrees, and the angular threshold for the case that the driver's unusual sound is not detected at 35 to 45 degrees. The condition setting unit 32 may set different angular thresholds depending on the orientation of the face. For example, the condition setting unit 32 may separately set the angular threshold in a direction where the face is directed downward or upward relative to the reference direction (i.e., pitch direction) and the angular threshold in a direction where the face is directed left or right relative to the reference direction (i.e., yaw direction). In addition, the condition setting unit 32 may separately set the angular threshold in the pitch or yaw direction and the angular threshold in a rotating direction around the reference direction (i.e., roll direction). In this case also, the condition setting unit 32 sets the angular threshold in one of the directions for the case where the driver's unusual sound is detected less than the angular threshold in this direction for the case where the driver's unusual sound is not detected.

Further, the condition setting unit 32 makes the time threshold for the case that the driver's unusual sound is detected less than the time threshold for the case where the driver's unusual sound is not detected. For example, the condition setting unit 32 sets the time threshold for the case where the driver's unusual sound is detected at 2 to 3 seconds, and the time threshold for the case where the driver's unusual sound is not detected at 5 to 10 seconds.

The condition setting unit 32 may change how to relax the abnormality determining condition, depending on the type of the detected unusual sound. For example, when the driver is coughing, the driver's face is probably turned downward. Thus, when the type of the detected unusual sound is coughing, the condition setting unit 32 makes the angular threshold of the downward pitch angle less than the angular threshold for the case where the driver's unusual sound is not detected. When the driver is snoring because of SAS, the driver's face is also probably turned downward. Thus, when the type of the detected unusual sound is snoring caused by SAS, the condition setting unit 32 also makes the angular threshold of the downward pitch angle less than the angular threshold for the case where the driver's unusual sound is not detected. For example, when an unusual sound of coughing or snoring caused by SAS is detected, the condition setting unit 32 sets the angular threshold of the downward pitch angle at 20 to 30 degrees, and the angular threshold for the case where the driver's unusual sound is not detected at 35 to 45 degrees. The condition setting unit 32 may make the angular thresholds of angles other than the downward pitch angle and the normal range of the position of the face for the case where an unusual sound of coughing or snoring caused by SAS is detected be the same as those for the case that the driver's unusual sound is not detected.

When the driver is snoring because of cerebral infarction, the driver's face is probably directed to left or right. Thus, when the type of the detected unusual sound is snoring caused by cerebral infarction, the condition setting unit 32 makes the angular threshold of the yaw angle less than the angular threshold for the case where the driver's unusual sound is not detected. For example, when an unusual sound of snoring caused by cerebral infarction is detected, the condition setting unit 32 sets the angular threshold of the yaw angle at 20 to 30 degrees, and the angular threshold for the case where the driver's unusual sound is not detected at 35 to 45 degrees. The condition setting unit 32 may make the angular thresholds of angles other than the yaw angle and the normal range of the position of the face for the case where an unusual sound of snoring caused by cerebral infarction is detected be the same as those for the case where the driver's unusual sound is not detected.

When the driver is sobbing, the driver is probably leaning forward and keeping his/her face turned downward. Thus, when the type of the detected unusual sound is sobbing, the condition setting unit 32 makes the angular threshold of the downward pitch angle less than the angular threshold for the case where the driver's unusual sound is not detected. In addition, when the type of the detected unusual sound is sobbing, the condition setting unit 32 makes the distance from the reference position to the lower limit of the normal range of the position of the face less than the distance for the case where the driver's unusual sound is not detected. The condition setting unit 32 may make the angular thresholds of angles other than the downward pitch angle and the ranges other than the lower limit of the normal range of the position of the face for the case where an unusual sound of sobbing is detected be the same as those for the case where the driver's unusual sound is not detected.

The condition setting unit 32 notifies the abnormality determining unit 34 of the set abnormality determining condition.

The posture detection unit 33 detects the driver's posture from the latest driver image received by the ECU 5 from the driver monitoring camera 3. In the present embodiment, the posture detection unit 33 detects the position and the orientation of the driver's face as information indicating the driver's posture.

The posture detection unit 33 detects a region representing the driver's face in the driver image (hereafter, a "face region"), for example, by inputting the driver image into a classifier that has been trained to detect a driver's face from an image. As such a classifier, the posture detection unit 33 can use, for example, a DNN having architecture of a CNN type or an AdaBoost classifier. In addition, the posture detection unit 33 detects multiple characteristic points of the driver's face, such as the inner and outer canthi, the tip of the nose, and the corners of the mouth, from the face region of the driver image. Specifically, the posture detection unit 33 detects the characteristic points of the face by inputting the face region into a classifier that has been trained to detect characteristic points of a face represented in an image. As such a classifier, the posture detection unit 33 can use, for example, a DNN having architecture of a CNN type, a support vector machine, or an AdaBoost classifier. The classifier for detecting a face region may be integrated with the classifier for detecting characteristic points of the face. In this case, the posture detection unit 33 can detect a face region and individual characteristic points of the face by inputting the driver image into the classifier. Alternatively, the posture detection unit 33 may detect the individual characteristic points of the driver's face from the face region by template matching of the face region with templates representing characteristic points of a face or in accordance with another technique to detect characteristic points of a face.

The posture detection unit 33 fits the detected individual characteristic points of the face into a three-dimensional face model representing the three-dimensional shape of a face. The posture detection unit 33 then detects the orientation of the face of the three-dimensional face model best fitted by the characteristic points as the driver's face orientation. The posture detection unit 33 may detect the driver's face orientation, based on the driver image, in accordance with another technique to determine the orientation of a face represented in an image.

In addition, the posture detection unit 33 detects the centroid position of the face region in the driver image as the position of the driver's face.

For each driver image, the posture detection unit 33 notifies the abnormality determining unit 34 of the result of detection of the driver's posture regarding the driver image, i.e., the result of detection of the position and the orientation of the driver's face.

The abnormality determining unit 34 determines that the driver's condition is abnormal, when the driver's posture detected by the posture detection unit 33 satisfies the abnormality determining condition. In the present embodiment, the driver's posture is represented by the position and the orientation of the driver's face, as described above. The abnormality determining condition is that a period for which the position or the orientation of the driver's face has been outside the normal range is not shorter than the time threshold. Thus, whenever the posture detection unit 33 notifies the abnormality determining unit 34 of the position and the orientation of the driver's face, the abnormality determining unit 34 determines whether the position and the orientation of the face are within the normal ranges set by the condition setting unit 32. When a period for which the position or the orientation of the driver's face has been outside the normal range is not shorter than the time threshold, the abnormality determining unit 34 determines that the driver's condition is abnormal.

The abnormality determining unit 34 notifies the warning processing unit 35 and the vehicle control unit 36 of the result of determination whether the driver's condition is abnormal.

FIG. 4A illustrates an example of determination of a driver's abnormality for the case where the driver's unusual sound is not detected. FIG. 4B illustrates an example of determination of a driver's abnormality for the case where the driver's unusual sound is detected. The abscissas in FIGS. 4A and 4B represent time.

In the example illustrated in FIG. 4A, since the driver's unusual sound is not detected, a normal range 410 of the orientation of the driver's face 400 is set relatively wide, and a time threshold T1 is set relatively long. For this reason, the driver's abnormality is detected when a period P1 for which the orientation 401 of the drive's face 400 has been inclined with respect to a reference direction 411 relatively large is not less than the relatively long time threshold T1.

In the example illustrated in FIG. 4B, since the driver's unusual sound is detected, a normal range 420 of the orientation of the driver's face 400 is set relatively narrowly, and a time threshold T2 is set less than the time threshold T1. For this reason, even if the orientation 402 of the driver's face 400 is not greatly inclined with respect to the reference direction 411, the orientation 402 of the face will fall outside the normal range 420. In addition, even if the period P2 during which the orientation 402 of the face is kept outside the normal range 420 is shorter than the period P1 illustrated in FIG. 4A, the period P2 can be not less than the time threshold T2. For this reason, the driver's abnormality is detected easily and early.

The warning processing unit 35 executes a predetermined warning process when the result of determination that the driver's condition is abnormal is received from the abnormality determining unit 34. For example, the warning processing unit 35 causes the speaker included in the notification device 4 to make an alarm or a voice signal requesting the driver to be in the driving posture. Alternatively, the warning processing unit 35 causes the display included in the notification device 4 to display a warning message requesting the driver to be in the driving posture, or may cause the vibrator included in the notification device 4 to vibrate.

When the result of determination that the driver is in a normal condition is received from the abnormality determining unit 34 after starting the warning process for requesting the driver to be in the driving posture with the notification device 4, the warning processing unit 35 stops executing the warning process.

The vehicle control unit 36 controls the vehicle 10 in accordance with a driving control level applied to the vehicle 10 until the result of determination that the driver's condition is abnormal is received from the abnormality determining unit 34. When the driving control level applied to the vehicle 10 is such that the driver does not participate in driving the vehicle 10, the vehicle control unit 36 controls the vehicle 10 so that the vehicle 10 keeps traveling along a current lane. To achieve this, the vehicle control unit 36 detects a lane-dividing line dividing the current lane from an adjoining lane as well as moving objects, such as other traveling vehicles around the vehicle 10, from an image generated by the outside camera. The vehicle control unit 36 then compares the detected lane-dividing line with the map information to estimate the position and the orientation of the vehicle 10. Based on the result of estimation of the position and the orientation of the vehicle 10 and the result of detection of individual moving objects around the vehicle 10, the vehicle control unit 36 controls the vehicle 10 so that the vehicle 10 does not collide with any of the moving objects and travels along the current lane.

When the result of determination that the driver's condition is abnormal has been received for a certain period from the abnormality determining unit 34, the vehicle control unit 36 controls the vehicle 10 so that the vehicle 10 makes an emergency stop. The vehicle control unit 36 may control the vehicle 10 so that the vehicle 10 makes an emergency stop immediately when the result of determination that the driver's condition is abnormal is received from the abnormality determining unit 34. To this end, the vehicle control unit 36 may stop the vehicle 10 after moving the vehicle 10 to a shoulder of the road, based on the result of estimation of the position and the orientation of the vehicle 10, the result of detection of individual moving objects around the vehicle 10, and the map information.

Figure 5:
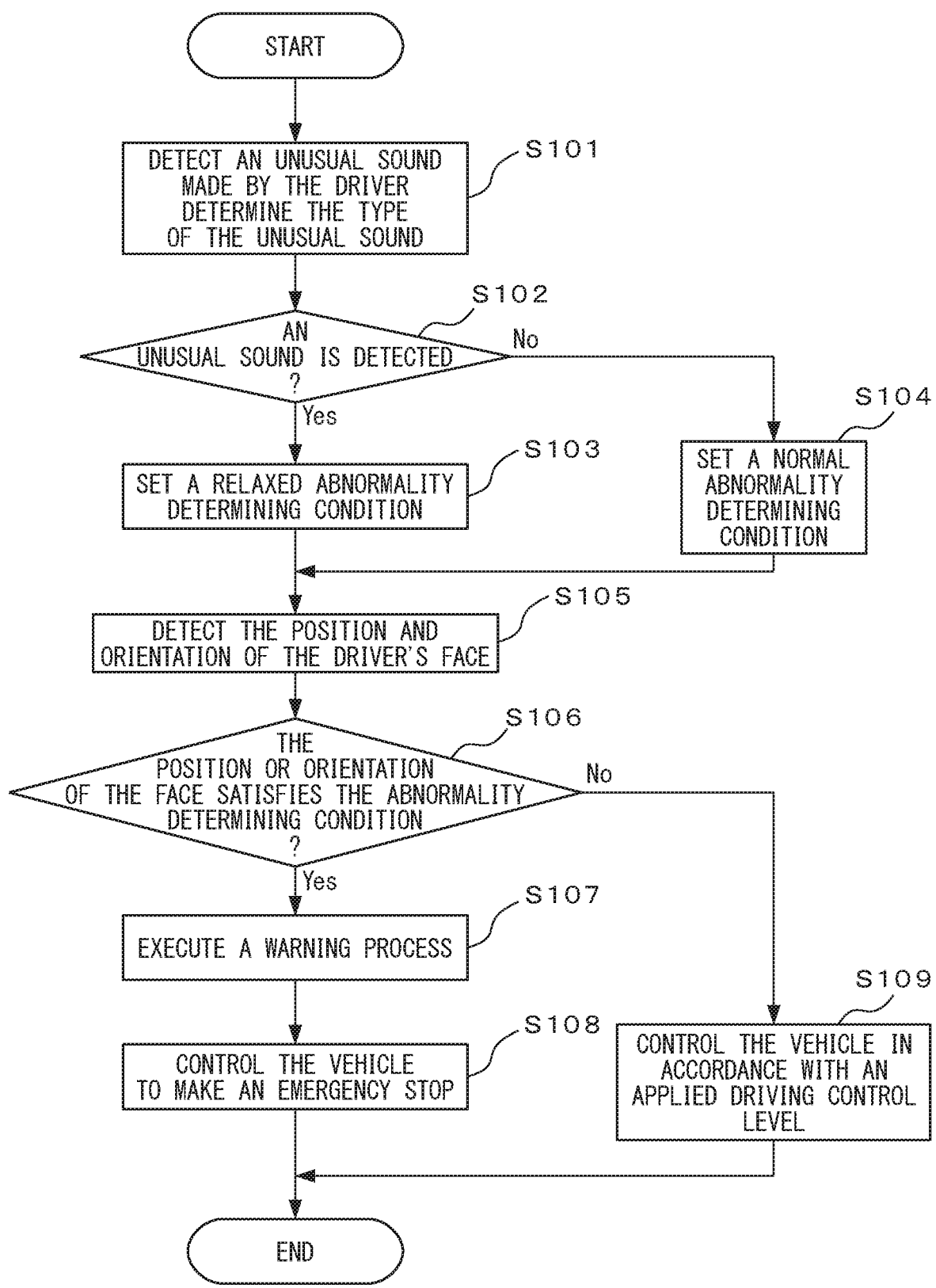
FIG. 5 is an operation flowchart of a vehicle control process including the driver monitoring process and executed by the processor of the ECU of a vehicle.

FIG. 5 is an operation flowchart of a vehicle control process including the driver monitoring process and executed by the processor 23. The processor 23 executes the vehicle control process in accordance with this operation flowchart at predetermined intervals.

The unusual-sound detection unit 31 of the processor 23 detects an unusual sound made by the driver, based on a voice signal received by the processor 23 from the microphone 2, and determines the type of the detected unusual sound (step S101).

The condition setting unit 32 of the processor 23 determines whether the driver's unusual sound is detected (step S102). When the driver's unusual sound is detected (Yes in step S102), the condition setting unit 32 sets a relatively relaxed abnormality determining condition (step S103). When the driver's unusual sound is not detected (No in step S102), the condition setting unit 32 sets an unrelaxed normal abnormality determining condition (step S104).

The posture detection unit 33 of the processor 23 detects the position and the orientation of the driver's face as the driver's posture from the latest driver image received by the ECU 5 from the driver monitoring camera 3 (step S105). The abnormality determining unit 34 of the processor 23 determines whether the position or the orientation of the driver's face satisfies the abnormality determining condition (step S106). More specifically, the abnormality determining unit 34 determines whether a period for which the position or the orientation of the driver's face has been outside the normal range is not shorter than the time threshold. When the position or the orientation of the driver's face satisfies the abnormality determining condition (Yes in step S106), the abnormality determining unit 34 determines that the driver's condition is abnormal. The warning processing unit 35 of the processor 23 then notifies the driver of a warning requesting the driver to be in the driving posture, with the notification device 4 (step S107). The vehicle control unit 36 of the processor 23 controls the vehicle 10 so that the vehicle 10 makes an emergency stop (step S108).

When the position and the orientation of the driver's face do not satisfy the abnormality determining condition in step S106 (No in step S106), the vehicle control unit 36 controls the vehicle 10 in accordance with a driving control level applied to the vehicle 10 (step S109).

After step S108 or S109, the processor 23 terminates the vehicle control process. The processor 23 may change the order of execution of the process of steps S101 to S104 and that of step S105, or execute the process of steps S101 to S104 and that of step S105 in parallel.

As has been described above, when an unusual sound made by a driver is detected on the basis of a voice signal of the interior of a vehicle, the driver monitor makes the abnormality determining condition based on the driver's posture detected from a driver image less strict than the abnormality determining condition for the case where no unusual sound is detected. In this way, the driver monitor can make the abnormality determining condition relatively strict when the driver is not making an unusual sound, and thus prevent erroneous detection of the driver's condition being abnormal when the driver is not in the driving posture. In addition, the driver monitor can detect the driver's abnormal condition relatively in a short time, because the driver monitor relaxes the abnormality determining condition to facilitate detecting the driver's abnormality when the driver's unusual sound is detected. For this reason, the driver monitor can appropriately detect the driver's abnormal condition.

According to a modified example, the abnormality determining condition may be set only for the orientation or the position of the driver's face. In this case, the posture detection unit 33 may detect only the position or the orientation of the driver's face for which the abnormality determining condition is set.

According to another modified example, the condition setting unit 32 may set only either of the normal range or the time threshold of the abnormality determining condition for the case where the driver's unusual sound is detected so as to make detection of the driver's abnormality easier than the abnormality determining condition for the case where no unusual sound is detected. For example, the condition setting unit 32 makes the normal range of the orientation or the position of the face for the case where the driver's unusual sound is detected more restricted than the normal range for the case where the driver's unusual sound is not detected. However, the condition setting unit 32 sets the time threshold at a fixed value, regardless of whether the driver's unusual sound is detected. Alternatively, the condition setting unit 32 sets the time threshold for the case where the driver's unusual sound is detected less than the time threshold for the case where the driver's unusual sound is not detected. However, the condition setting unit 32 sets the normal range of the orientation or the position of the face at a fixed range, regardless of whether the driver's unusual sound is detected.

The computer program for achieving the functions of the processor 23 of the ECU 5 according to the embodiment or modified examples may be provided in a form recorded on a computer-readable and portable medium, such as a semiconductor memory, a magnetic medium, or an optical medium.

As described above, those skilled in the art may make various modifications according to embodiments within the scope of the present invention.

What is claimed is:

1. A driver monitor comprising:
   a processor configured to:
   detect at least either one of a position and an orientation of a face of a driver as a posture of the driver of a vehicle from an image of an interior of the vehicle generated by a camera provided on the vehicle,
   determine that a condition of the driver is abnormal based on a determination the detected posture of the driver satisfies an abnormality determining condition, wherein the abnormality determining condition specifies that a period during which the orientation or the position of the face of the driver's face has been outside a predetermined normal range is longer than a predetermined time threshold,
   determine, based on a voice signal of the interior of the vehicle obtained by a microphone provided in the vehicle, whether a sound made by the driver corresponds to one or more sounds classified as an unusual sound,
   based on a determination the sound made by the driver is classified as the unusual sound, modify a threshold associated with the abnormality determining condition such that a number of occurrences in which the detected posture of the driver satisfies the abnormality determining condition is increased, and
   based on a determination that the unusual sound is not detected, decrease the predetermined normal range compared to the case that the unusual sound is detected or decrease the predetermined time threshold compared to the case that the unusual sound is detected.

2. The driver monitor according to claim 1, wherein the processor is further configured to determine a type of the unusual sound depending on the condition of the driver making the unusual sound, and
   wherein the processor is further configured to set the predetermined normal range based on the type of the unusual sound.

3. The driver monitor according to claim 2, wherein the predetermined normal range is a range of a downward angle of the face of the relative to a reference direction, and
   wherein the processor is configured to set the range of the downward angle for a case where the type of the detected unusual sound is a sound of coughs of the driver or snores of the driver caused by sleep apnea syndrome to be smaller than the range of the downward angle for a case where the unusual sound is not detected.

4. The driver monitor according to claim 2, wherein the predetermined normal range is a range of a horizontal angle of the face of the driver relative to a reference direction, and
   wherein the processor is configured to set the range of the horizontal angle for a case where the type of the detected unusual sound is a sound of snores of the driver caused by cerebral infarction more to be smaller than the range of the horizontal angle for a case where the unusual sound is not detected.

5. The driver monitor according to claim 2, wherein the predetermined normal range is a range of a downward angle of the face of the driver relative to a reference direction and a range of the position of the face of the driver around the reference position, and
   wherein the processor is configured to the range of the downward angle for a case where the type of the detected unusual sound is a sound of a sob of the driver to be smaller than the range of the downward angle for a case where the unusual sound is not detected, and
   wherein the processor is configured to set the distance from the reference position to a lower limit of the normal range for the case where the type of the detected unusual sound is a sound of the sob of the driverless than the distance for the case where the unusual sound is not detected.

6. A method for monitoring a driver, comprising:
   detecting at least either one of a position and an orientation of a face of a driver as a posture of the driver of a vehicle from an image of an interior of the vehicle generated by a camera provided on the vehicle;
   determining that a condition of the driver is abnormal based on a determination the detected posture of the driver satisfies an abnormality determining condition, wherein the abnormality determining condition specifies that a period during which the orientation or the position of the face of the driver's face has been outside a predetermined normal range is longer than a predetermined time threshold;
   determining, based on a voice signal of the interior of the vehicle obtained by a microphone provided in the vehicle, whether a sound made by the driver corresponds to one or more sounds classified as an unusual sound;
   based on a determination the sound made by the driver is classified as the unusual sound, modifying a threshold associated with the abnormality determining condition such that a number of occurrences in which the detected posture of the driver satisfies the abnormality determining condition is increased; and
   based on a determination that the unusual sound is not detected, decreasing the predetermined normal range compared to the case that the unusual sound is detected or decrease the predetermined time threshold compared to the case that the unusual sound is detected.

7. A non-transitory recording medium that stores a computer program for monitoring a driver, the computer program causing a processor mounted on a vehicle to execute a process comprising:
   detecting at least either one of a position and an orientation of a face of a driver as a posture of the driver of the vehicle from an image of an interior of the vehicle generated by a camera provided on the vehicle;
   determining that a condition of the driver is abnormal based on a determination the detected posture of the driver satisfies an abnormality determining condition, wherein the abnormality determining condition specifies that a period during which the orientation or the position of the face of the driver's face has been outside a predetermined normal range is longer than a predetermined time threshold;

determining, based on a voice signal of the interior of the vehicle obtained by a microphone provided in the vehicle, whether a sound made by the driver corresponds to one or more sounds classified as an unusual sound, based on a determination the sound made by the driver is classified as the unusual sound, modifying a threshold associated with the abnormality determining condition such that a number of occurrences in which the detected posture of the driver satisfies the abnormality determining condition is increased, and based on a determination that the unusual sound is not detected, decrease the predetermined normal range compared to the case that the unusual sound is detected or decrease the predetermined time threshold compared to the case that the unusual sound is detected.

* * * * *